United States Patent [19] [11] 4,050,742
Hughes et al. [45] Sept. 27, 1977

[54] TRANSPORTING HEAVY FUEL OIL AS A SLURRY

[75] Inventors: Raymond H. Hughes, La Place, La.; Carl D. Clay, Casper, Wyo.

[73] Assignee: Marathon Oil Company, Findlay, Ohio

[21] Appl. No.: 738,799

[22] Filed: Nov. 4, 1976

[51] Int. Cl.[2] .......... B65G 53/30

[52] U.S. Cl. .......... 302/66; 44/7 R; 44/7 E; 137/13; 208/370; 252/316; 264/7; 264/130; 427/212

[58] Field of Search .......... 302/66; 264/7, 130, 264/131; 137/13; 427/212; 252/316; 208/37, 370; 44/7 R, 7 E

[56] References Cited

U.S. PATENT DOCUMENTS

| | | | |
|---|---|---|---|
| 3,456,987 | 7/1969 | Hughes et al. | 302/66 |
| 3,468,986 | 9/1969 | Watanabe | 302/66 |
| 3,804,752 | 4/1974 | Merrill et al. | 208/370 |
| 3,846,279 | 11/1974 | Merrill | 302/66 |
| 3,853,356 | 12/1974 | Merrill | 302/66 |
| 3,880,177 | 4/1975 | Kersch | 302/66 |
| 3,900,041 | 8/1975 | Kersch et al. | 302/66 |
| 3,900,391 | 8/1975 | Merrill et al. | 208/370 |

*Primary Examiner*—John J. Love
*Assistant Examiner*—Jeffrey V. Nase
*Attorney, Agent, or Firm*—Joseph C. Herring; Jack L. Hummel

[57] ABSTRACT

Heavy fuel oil having an average pour point above the average minimum temperature of a transporting system is effectively transported by first physically separating the heavy fuel oil into two portions, fractionating the first portion into a relatively low pour point fraction and a relatively high pour point fraction, recombining the relatively low pour point fraction with the second portion, congealing the second portion to form particles, coating the congealed particles with the relatively high pour point fraction and thereafter slurrying the coated, congealed particles in a carrier liquid, preferably water, and transporting the slurry in a transportation system, preferably a pipeline.

6 Claims, No Drawings

TRANSPORTING HEAVY FUEL OIL AS A SLURRY

BACKGROUND OF THE INVENTION

1. Field of the Invention

This invention relates to the transporting of heavy fuel oil in a transportation system, e.g., a pipeline. The heavy fuel oil is congealed into particles, the particles are coated with a high pour point fraction of the heavy fuel in question and the coated particles are slurried with water for transporting in a pipeline.

2. Prior Art

Pumping of heavy fuel oils at temperatures below the pour point thereof is very difficult. These fuels are very viscous and cannot by pumped at usual pipeline temperatures. Heating pipelines to adequately reduce viscosity is uneconomical and the use of pour point depressors and viscosity breaking agents have been tried with little success. In addition, heavy residual fuels have been congealed, suspended in water, and the combination pumped at temperatures below the pour point of the heavy residual fuel.

Examples of patents representative of the art include:

Merrill, et al., in U.S. Pat. No. 3,804,752, teaches the transportation of waxy crude oils by separating the mixture into high and low pour point fractions, congealing the high pour point fraction and thereafter slurrying the congealed particles in the low pour point fraction at a temperature below the congealation temperature of the high pour point fraction.

Fonseca, et al., in U.S. Pat. No. 3,767,738, coats prilled sulfur pellets with a polyhydroxy compound to inhibit degradation during pipelining in a fluid carrier.

Bonteil, in U.S. Pat. No. 3,670,520, atomizes a liquid or a semi-liquid product into droplets and passes those droplets down through a rising current of cold gas which superficially freezes the droplets whereupon the droplets fall in a fluidized bed where the freezing process is completed.

Sachsel, et al., in U.S. Pat. No. 3,202,533, freezes compounds which are liquid at room temperature into frozen core particles and incapsulates the particles with materials insoluble in a storage solvent at room temperature.

Nack, in U.S. Pat. No. 3,036,338, creates substantially spherical pellets of fusible materials and coats the pellets to prevent agglomeration.

Moar, in U.S. Pat. No. 3,026,568, forms bitumen pellets or granules by spraying them downwardly into an upwardly direct stream of air carrying a powder which coates the pellets or granules preventing adherence and agglomeration.

Watanabe, in U.S. Pat. No. 3,468,986, forms spherical particles of a wax/polymer blend by disbursing the melted blend in a non-solvent liquid (e.g., water) and thereafter cooling the disbursed wax/polymer blend to form discrete solid particles which can be coated with finely divided coating solids such as calcium carbonate, etc.

Merrell, in U.S. Pat. No. 3,853,356, fractionates a crude oil into a relatively high pour point fraction, a relatively medium pour point fraction, and a relatively low pour point fraction; the medium pour point fraction being congealed and slurried in a mixture of the relatively low pour point fraction and a portion of the high pour point fraction.

This technology has generally proven to be economically unattractive and technically ineffective for heavy fuel oils which have a tendency to dissolve and agglomerate in a carrier liquid.

SUMMARY OF THE INVENTION

Applicants have discovered a new and commercially attractive process for transporting heavy fuel oils as slurries with a carrier liquid. The process comprises physically separating the heavy residual fuel oil into a first and a second portion, fractionating the first portion into a relatively low pour point fraction and a relatively high pour point fraction, recombining the relatively low pour point fraction with the second portion, congealing the second portion to obtain congealed particles, coating the congealed particles with the high pour point fraction of the first portion, slurrying the coated congealed particles in a carrier liquid and transporting the slurry in a transportation system, preferably a pipeline. The first and second portions, which remain identical in composition, are separated so that only a relatively small portion need be fractionated.

PREFERRED EMBODIMENTS OF THE INVENTION

Hydrocarbon mixtures having average pour points above the seasonably ambient temperature of the transportation system are useful with this invention. Heavy fuel oil is particularly useful. Heavy fuel oil is defined as the refinery residue after the desirable marketable products such as gasoline, kerosene, lubricating oil, wax, and distillate fuel oil have been extracted from the crude. Examples of heavy fuel oils particularly useful with this invention include those having SFU (Saybolt Furol Universal) viscosity at 50° C of about 50 to about 300° SFU and preferably about 150 to about 250 and more preferably those having viscosities greater than about 200° SFU.

The heavy fuel oil is separated into a first portion and a second portion. The first portion can be about 1% to about 10%, preferably about 2% to about 8% and more preferably about 2% to about 4% of the original heavy fuel oil.

The separation of the first portion and the second portion is a purely physical separation and is accomplished by any of a variety of methods, such as pouring off the first portion and leaving the second portion. The composition of the first and second portions preferably remain identical; however, the separation technique can effect a physical change on the portions.

The first portion of the heavy fuel oil is first fractionated into at least two fractions, an overheads fraction which has a relatively low pour point (also identified as having a density and viscosity at a given temperature lower than the original heavy fuel oil and a bottoms fraction which is a relatively high pour point (also identified as having a density and viscosity at a given temperature above that of the original heavy fuel oil). The low pour point fraction should have a pour point of at least 1° and preferably at least 5° F below the average of the minimum temperature range of the transporting system, e.g., a pipeline or a combination of pipeline and tank battery.

After the first portion of the heavy fuel oil is fractionated, all or at least a portion of the low pour point fraction is recombined with the second portion of the heavy fuel oil. Additionally, the second portion of the heavy fuel oil including the low pour point fraction of the first portion is thereafter congealed or comminuted to form substantially solid particles having as average diameter of about 0.05 to about 20 or more mm (millimeters) and preferably about 0.1 to about 5mm and more preferably about 0.5 to about 3mm. The particles are preferably spherical and can be substantially uniform or random diameter sizes. Comminution is accomplished by prilling, extruding, molding, shredding, grinding, and like methods for disbursing or disintegrating the uncongealed or congealed material. Congealing as used herein includes solidification, crystalization, making into a consistency like jelly, etc.

Prilling can be accomplished by spraying the second portion of the heavy fuel oil into a prilling tower where the prills come in contact with gas (e.g., air, $N_2$, $CO_2$, natural gas, or like gases) and/or water. Air is the preferred gas and is preferably moved through the prilling tower by natural or forced convection at velocities sufficient to not exceed the drop or settling rate of the prills falling through the tower; air velocities below about 6 m/s (meters per second) and preferably below 3 m/s and more preferably below about 1.5 m/s are useful. The temperature of the air entering the prilling tower is preferably about 1° to about 125° C and more preferably about 5° to about 85° C below the congealing temperature of the prill. The temperaure of the air leaving the prilling tower is preferably about 125° C below to about 85° C above and more preferably about 55° C below to about 5° C above the average congelation temperature of the second portion of the heavy fuel oil entering the prilling tower.

After the second portion of the heavy fuel oil is congealed into the desired particle size, the particles are coated with the high pour point fraction obtained from the first portion of the heavy fuel oil. The coating is accomplished by spraying the high pour point fraction into a chamber through which the particles are falling, by submerging the particles in a bath of the high pour point fraction, or by any other method known in the art. The particles, as a result, become coated with the high pour point fraction, thereby providing each particle with a protective layer of the high pour point fraction having a pour point higher than that of the heavy fuel oil comprising the particles. The purpose and effect of this coating is described later.

After the particles are coated with the high pour point fraction, at least a portion and preferably all of the particles are slurried (e.g., combined or mixed) with a carrier liquid. The carrier liquid may be non-miscible with hydrocarbon. Preferably, the carrier liquid is an aqueous solution (e.g., water). During the slurrying operation, the temperature of the carrier liquid is preferably about 15° C below to about 15° C above and more preferably about 10° C below to about 10° C above the minimum, seasonably ambient temperature of the transportation system. Also, the temperature of the carrier liquid during slurrying should be below and preferably at least about 3° C and more preferably at least about 10° C and most preferably at least about 15° C below the solution temperature of the high pour point fraction comprising the coating on the particles of heavy fuel oil.

The slurry can be transported in bulk, e.g., tank car, tank truck, tank trailer, tank barge, tanker or like means, but is preferably transported in a conduit, such as a pipeline. Of course, the conduit or pipeline system can have tank batteries, e.g., collection and holding tanks, associated with it.

The slurry can be transported under laminar, transitional (e.g., Reynolds Number range of about 2,000 to about 4,000 ) or turbulant flow conditions in the conduit. Turbulant flow conditions may be preferred where it is desired to maintain the congealed particles in a "homogenious"disbursed state.

The slurry is preferably transported in a conduit wherein the average maximum temperature of the conduit in at least its major initial length is below the solution temperature of the high pour point fraction comprising the coating for the particles of heavy fuel oil. The average maximum temperature of the conduit is preferably at least about 1° C below and more preferably at least about 3° C below the average solution temperature of the high pour point fraction comprising the coating; solution temperature as used herein means the temperature at which substantially all of the high pour point fraction comprising the coating is in solution within the continuous phase of the slurry.

By so coating the congealed particles of a heavy fuel oil with a high pour point fraction of the original heavy fuel oil, the effective pour point of the heavy fuel oil comprising the particles is increased to that of the high pour point fraction. By coating the particles with a high pour point fraction, the rate of dissolution and agglomeration of the particles within the carrier liquid is substantially reduced.

What is claimed is:

1. A process for transporting heavy fuel oil as a slurry in water, the process comprising:

a. separating the heavy fuel oil into a first portion and a second portion;
b. fractionating the first portion into a relatively low pour point fraction and a relatively high pour point fraction;
c. recombining the relatively low pour point fraction with the second portion;
d. substantially congealing at least a portion of the second portion of the heavy fuel to obtain congealed particles of the heavy fuel oil;
e. coating the congealed particles with the relatively high pour point fraction;
f. slurrying the coated, congealed particles in a carrier liquid; and
g. transporting the slurry in a transportation system.

2. The process of claim 1 wherein:

a. the first portion comprises an average of about 1% to about 10% by volume of the heavy fuel oil; and
b. the second portion comprises an average of about 90% to 99% by volume of the heavy fuel oil.

3. The process of claim 1 wherein congealation is effected by prilling.

4. The process of claim 1 wherein the carrier liquid is an aqueous liquid.

5. The process of claim 1 wherein the transportation system is a conduit.

6. The process of claim 1 wherein the slurry remains stabilized in a transportation system at temperatures up to about 50° C.

* * * * *